Figure 1:
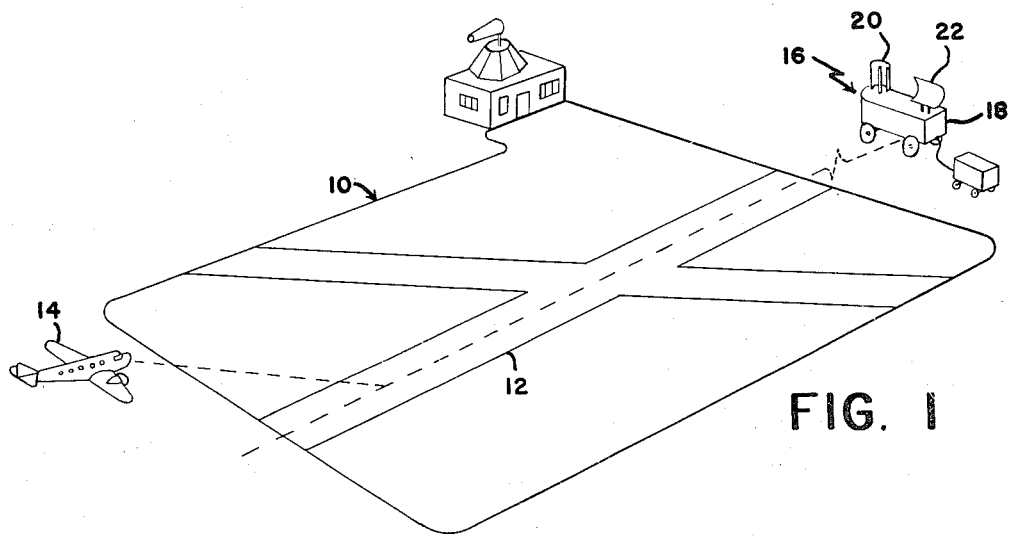

June 19, 1956 G. V. RODGERS 2,751,588
THREE DIMENSIONAL RADAR INDICATOR
Filed Oct. 29, 1952 3 Sheets-Sheet 1

INVENTOR
GEORGE VICTOR RODGERS
BY George Sipkin
B. L. Zanguill
ATTORNEYS

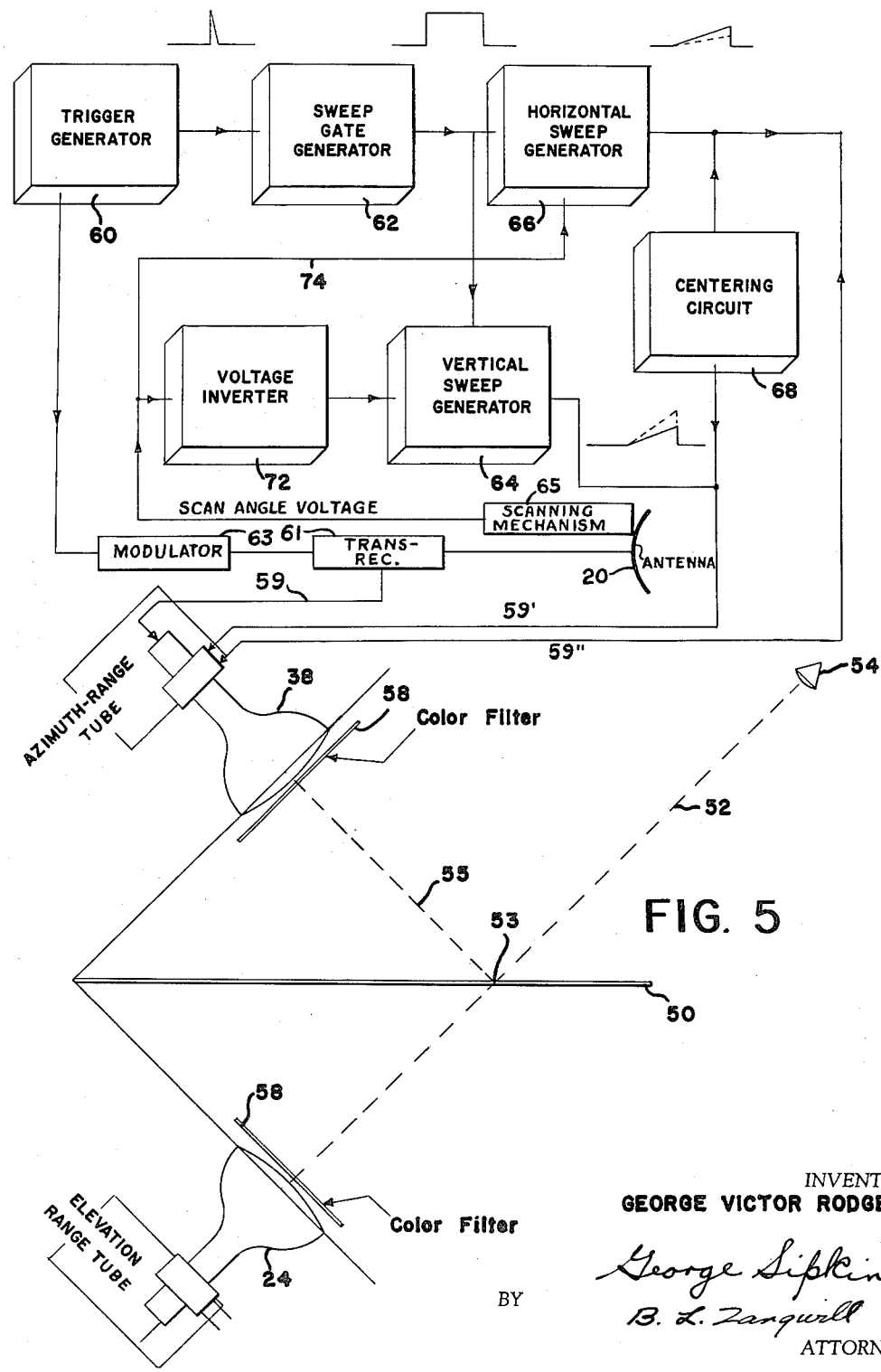

United States Patent Office 2,751,588
Patented June 19, 1956

2,751,588

THREE DIMENSIONAL RADAR INDICATOR

George Victor Rodgers, Lexington Park, Md.

Application October 29, 1952, Serial No. 317,608

3 Claims. (Cl. 343—112)

(Granted under Title 35, U. S. Code (1952), sec. 266)

The invention described herein may be manufactured and used by or for the Government of the United States of America for governmental purposes without the payment of any royalties thereon or therefor.

The present invention relates to a radar landing system for aircraft and more particularly to a radar landing system producing a simulated three-dimensional indication of the flight of an aircraft along a desired guide path.

The increasing use of air transportation has required the development of improved blind landing facilities to permit safe all weather flying. The wartime developments in radar along these lines have greatly advanced the reliability of air travel. One of the outgrowths of the blind landing development programs was the ground controlled approach or G. C. A. system. This system employs a radar installation located beyond the end of a runway from which a radar operation crew observes an incoming aircraft by way of the radar equipment and gives correcting flight instructions by radio to the pilot of the aircraft making an instrument landing. Under this system, the aircraft needs no additional equipment other than the usual blind flying instruments and a two-way radio since the pilot flies a course given to him from the ground installation.

The radar installation of a G. C. A. system consists of electronic equipment which will locate the airplane as to its distance and azimuth direction from the equipment and as to its distance and vertical displacement from the equipment. The two measurements are displayed separately upon the screens of a pair of oscilloscopes wherein the location of the aircraft is indicated with a high degree of accuracy with respect to a desired flight path in each of two planes. However, the system requires either two separate operators or a single operator to observe two instruments at the same time. Experience has shown that the use of two operators in a crew is expensive and confusing, and also that a single operator tends to concentrate on one or the other instrument to the exclusion of the remaining one. Hence inaccurate or incomplete instructions are supplied to the aircraft which may result in a dangerous situation.

In the present invention, the location of the aircraft in both its azimuth and elevational geometrical planes is displayed on a single instrument which immediately informs a single operator of deviations by the aircraft from the desired glide path and also indicates the range of the aircraft from the runway. Thus, a single operator is able to concentrate his undivided attention upon a single instrument supplying all the needed information. In accordance with the present invention, the display image of the azimuth-range oscilloscope is superimposed upon the display image of the elevation-range oscilloscope in such a manner as to form a single simulated three-dimensional view of the location of the aircraft with respect to the desired glide path and in which each geometrical plane is set out in a distinctive color for simple and accurate interpretation.

Accordingly, it is an object of the present invention to provide a ground controlled approach landing system employing a single indicating display unit.

A further object of the present invention is to provide a ground controlled approach system producing a three-dimensional display of the position of the aircraft in space.

Another object is to provide a single multiple colored indication of an aircraft approaching a landing along a desired glide path.

Figure 2:
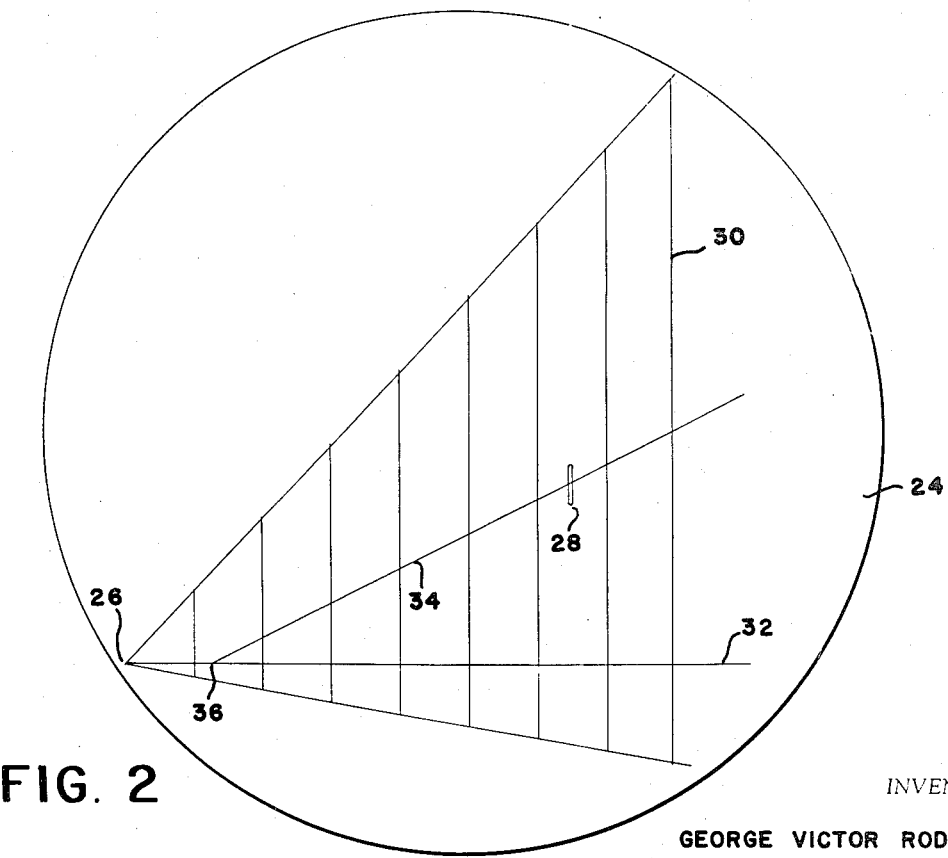
Figure 3:
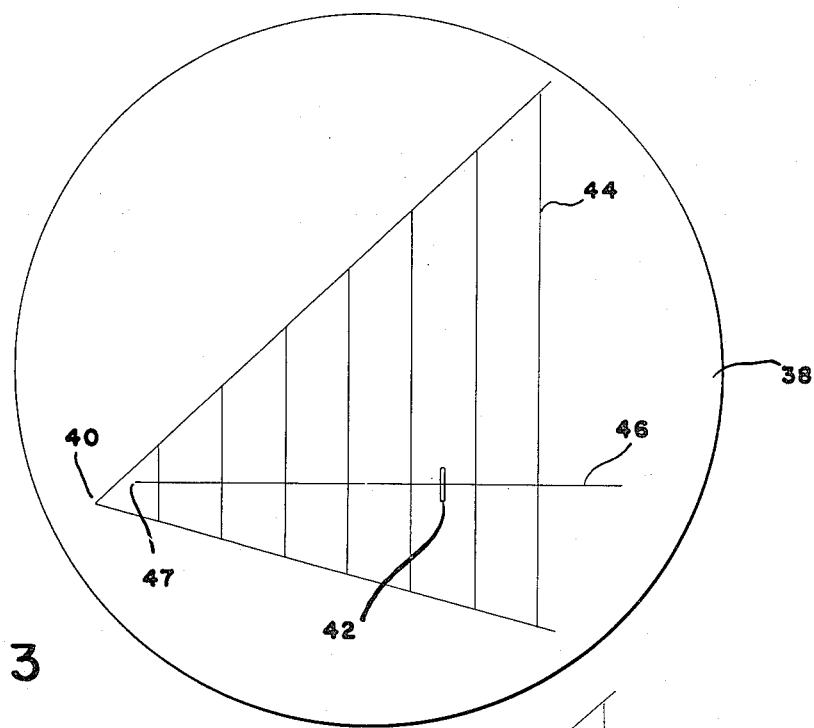
Figure 4:
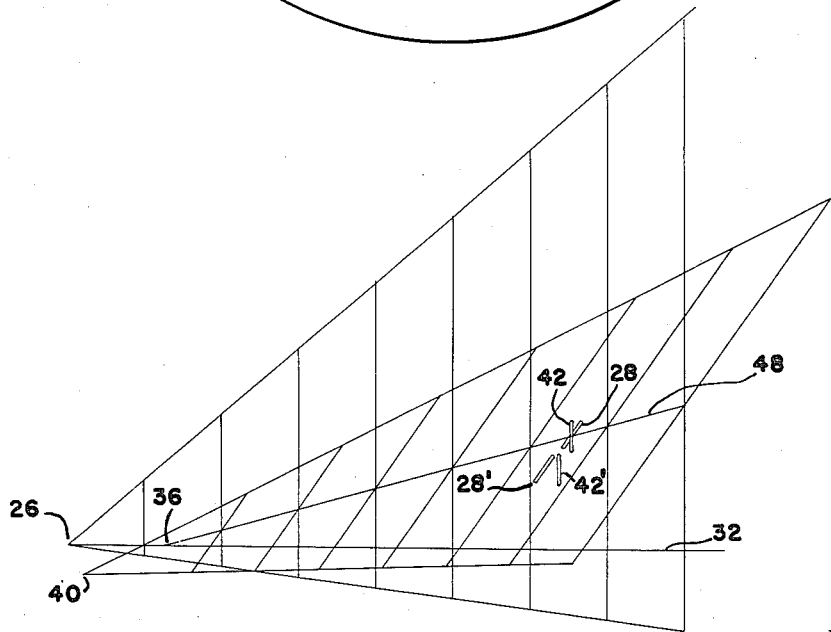

With these and other objects in view, as will hereinafter appear, and which will be more particularly pointed out in the appended claims, reference is now made to the following description taken in connection with the accompanying drawings in which:

Fig. 1 is a view of an airport equipped with a conventional ground controlled approach landing system;

Fig. 2 is a view of the display on the elevation-range oscilloscope of the conventional G. C. A. landing system;

Fig. 3 is a view of the display on the azimuth-range oscilloscope of the conventional G. C. A. landing system;

Fig. 4 is a view of the display of the present invention wherein the azimuth-range and elevation-range display images are superimposed to provide a simulated three-dimensional view thereof; and Fig. 5 is a combined view, partly schematic and partly in plan, of apparatus in accordance with the invention for producing a single three-dimensional display, duplicate circuit components being omitted for clarity.

Referring now to the drawings, wherein like reference characters designate like or corresponding parts throughout the several views, there is shown in Fig. 1 an airport 10 having a runway 12 approximately parallel to the wind direction upon which landings by an aircraft 14 are made. Situated beyond the runway 12 is the ground controlled approach radar landing unit 16 mounted upon a mobile unit 18 so as to allow orientation of the installation on the desired runway. The radar unit includes an azimuth antenna 20 and an elevation antenna 22 which are connected to conventional radar equipment located within the unit and operate to locate the aircraft 14 in the azimuth and elevation planes respectively.

Associated with the radar system 16 in the conventional manner are separate oscilloscopes 24 and 38 operating in synchronism with the movements of the respective antennas 22 and 20. As shown in Fig. 2, the elevation-range oscilloscope 24 of the radar system 16 produces a triangular trace on its screen in which the location of the radar equipment is represented by the point 26 and the approaching aircraft is represented by an elongated spot 28 extending parallel to a plurality of vertical range lines or marks 30, which lines represent units of distance, such as quarter miles, between each pair of two lines. The line 32 extending normal to the vertical lines 30 represents the ground line or zero altitude and the line 34 represents the desired glide path of the approaching aircraft. The point of intersection of the line 34, representing the desired glide path, and the ground line 32 represents the touchdown point 36 or the point at which it is desired that the aircraft touch the ground on the runway. Provided the aircraft remains upon the glide path without deviating therefrom, the aircraft will land at the desired touchdown point.

The azimuth-range oscilloscope 38 of the radar system 16 as shown in Fig. 3 produces a triangular trace on its screen in which the radar installation is represented by the point 40 and the aircraft is represented by an elongated spot 42 extending parallel to a series of vertical range lines or marks 44 which represent a set distance, such as quarter miles, between them. The line 46 extending approximately normal to the vertical lines represents the horizontal projection of the desired flight path of the aircraft extending directly over the center of the runway in use while the end point 47 of the line 46 represents the touchdown point on this display.

As long as the aircraft remains on the lines 34 and 46 of the two displays, the aircraft will be on course and will make a safe landing on the runway at the touchdown point which point is situated a sufficient distance from the end of the runway to permit the plane to come to a safe stop without danger of overrunning the runway. Any deviations from this course by the aircraft are observed by the radar operations crew and transmitted to the pilot of the incoming plane by radio, who then corrects his course accordingly.

Fig. 4 shows a display arrangement, according to the present invention, wherein the elevation-range and the azimuth-range display images are superimposed upon each other to present a single simulated three-dimensional display of the aircrafts position in space with reference to a single common line. As clearly shown, the azimuth-range display image is superimposed upon the elevation-range display in such a position that the flight path line in azimuth coincides with the glide path line in elevation to form a common line 48 representing the intersection of the two planes. The point of intersection of the common line 48 and the ground line 32 of the elevation-range display represents the touchdown point 36 for the aircraft. With the azimuth-range display image superimposed upon the elevation-range display image, the aircraft appears upon the display in the form of an X travelling along the common line 48 representing the glide path and the flight path. An X is formed since the aircraft is represented by an elongated spot extending parallel to the vertical range lines in each of the displays, and in alignment of the flight path line and the glide path line, the vertical range lines of the two displays are positioned at an angle relative to each other. Hence, the spots in each display, representing the aircraft, are at an angle to each other and form an X.

Deviations by the aircraft from the common desired flight line will split the X into its two separate spots as illustrated by 28' and 42' in Fig. 4 where the aircraft has deviated below the elevation glide path 34 and to left of the glide path line 46, both of which are represented by a single common line 48. It is evident that in the single display, deviations in elevation may be distinguished from deviations in azimuth by the direction in which the elongated spots representing the aircraft are directed with relation to the direction of the vertical range lines.

In the single display, the location of the radar installation is represented by the point 26 whereas the point 40 normally representative of the radar installation in the single azimuth display serves only as a reference point due to the displaced positioning of the latter display to obtain the single superimposed display in the unit. However, this superimposition of the individual display images does not effect the accuracy of the original displays because the final display follows the same slope as the original displays and the length of the range lines in each instant are held constant.

The apparatus for obtaining the single three-dimensional display of the azimuth-range and elevation-range displays is shown in the lower part of Fig. 5 and includes oscilloscopes 24 and 38, each of which are positioned at an angle of 90 degrees with respect to the other, and an optical system including an optical axis 52 and a partially reflecting or half-silvered mirror 50. The optical axis extends parallel to the oscilloscope 38 and passes through the half-silvered mirror at a point 53 from a viewing position 54 to the screen of the oscilloscope 24. The half-silvered mirror 50 is positioned in a vertical plane intermediate the oscilloscopes 24 and 38 at an angle of 45 degrees with respect to each of the oscilloscopes and extends beyond the optical axis 52. A secondary axis 55 extending through the axis of the oscilloscope 38 and normal to the optical axis 52, intersects the optical axis at the point 53. Since the half-silvered mirror intersects the axes at the point 53, an observer viewing the mirror from the observing position 54, which is represented by an eye in the drawing, will see a single representation comprising the image of the display from the oscilloscope 24 superimposed upon the image of the display from the oscilloscope 38. This is so because the half-silvered mirror will reflect the image of the oscilloscope 38 toward the observer and will permit the observer to view the display on the oscilloscope 24 directly since it is located in the optical axis.

The distance between the point of intersection 53 and the screens of the oscilloscopes 24 and 38 are equal so the superimposed display images appear in the same scale and thus are presented as if they were at identical points along the optical axis. Hence, when output voltages are applied from the radar apparatus in a known manner to each of the oscilloscopes 24 and 38 such that oscilloscope 24 has an elevation-range input signal fed thereto and produces a display on its screen as shown in Fig. 2 and the oscilloscope 24 has an azimuth-range input signal fed thereto from the radar apparatus and produces a display upon its screen as in Fig. 3, there will be produced on the half-silvered mirror as viewed from the observing position 54 a single superimposed representation of the two displays. This display may be observed by a single observer and will provide all the information necessary with relation to the position of the aircraft in space without the observer having his attention diverted between several instruments.

Although the aircraft on the elevation-range display may be distinguished from the aircraft on the azimuth-range display by the directional position of the elongated spots representative of the aircraft, further distinguishing means are provided. Positioned immediately in front of each of the oscilloscopes 28 and 34, in a vertical plane, is a distinctive colored plastic filter 58 through which light rays from the images displayed on the respective screens of the oscilloscopes pass through to the half-silvered mirror. Consequently, the light rays will produce distinctive colors upon the display representative of the particular image associated with that color. The distinctive colors in each plane permit simple and effortless recognition of the particular displays upon the mirror surface. In an embodiment of the invention, a blue colored filter is used with the azimuth display while a red color filter is used with the elevation display. It is obvious, of course, that other colors or multiple colors may be employed in each plane. As for instance, on the elevation presentation, the display below the glide path could be red and the display above the glide path could be blue whereas the left of the flight path of the azimuth display may be green and the right of the flight path yellow. By using multiple colors even further means are provided for the operator to distinguish between the displays.

Upon producing a single representation, it is necessary to adjust the apparatus associated with each display to obtain a complete superimposition of the presentation as illustrated in Fig. 4. Thus, in order to have the individual lines and points of each display superimposed one upon the other, it is necessary that the azimuth oscilloscope 38 be rotated by turning the deflection yoke or by turning the entire azimuth oscilloscope assembly until the line corresponding to the flight path on the azimuth display is parallel to the line representing the glide path on the elevation display. Then, the azimuth centering controls and the electronic sweep control of the azimuth control circuit are varied to bring the flight path on the azimuth display in a superimposed position with the glide path on the elevation display. Also, the controls of the azimuth oscilloscope are manipulated to bring the range marks in azimuth in alignment with each range mark of the elevation display along the common flight line. In so doing, all points will be in proper relation with each other with the exception of point 40 which represents the location of the radar apparatus upon the azimuth display. As stated herebefore this point is a reference point only on the single display. This, however, will not affect the accuracy of the display since the point 26 will now act to provide the location of the radar apparatus.

In Fig. 4 it will be noted that the azimuth-range display is slanted in a direction to the right of the display as illustrated in Fig. 3. The slant is produced by the circuit disclosed in Fig. 5 to provide a more realistic three-dimensional presentation of the display for simple and effortless determination of the position of the aircraft by the observer. The circuit consists of typical and conventional circuitry for producing the desired elevation and azimuth displays of Figs. 2 and 3 with a slight modification therein.

Each of the oscilloscopes or tubes 24 and 38 are parts of separate conventional radar circuits, except that the former is designed for presenting elevation versus range information and the latter for presenting azimuth versus range information. Accordingly, a description of one will suffice for both, the description being directed to the azimuth equipment as shown in the upper part of Fig. 5.

The oscilloscope or tube 38 has the standard connections 59, 59', and 59" for connecting information and control signals to the grid, the vertical deflection plates and the horizontal deflection plates.

Generally a circuit of this type includes the trigger circuit 60 which generates repetitive trigger pulses at predetermined time intervals to synchronously time the operation of a sweep-gate generator 62 and a modulator 63 for controlling a transmitter part of component 61 so as to generate pulses for transmission via antenna 20. These periodic pulses from the trigger generator are applied to the sweep-gate generator 62, consisting of a multi-vibrator, whereby the generator produces output pulses manually adjusted for a predetermined duration or length by variation of the various constants in the circuit. The duration of the output pulses from the sweep-gate generator 62 determines the range of operation of the radar display apparatus by controlling the duration of a saw-toothed wave generated by a horizontal sweep generator 66 and a vertical sweep generator 64 conneced respectively by connections 59" and 59' to the horizontal and vertical deflection plates of the azimuth-range oscilloscope 38. Output pulses from the horizontal sweep are applied to the horizontal deflection plates of the oscilloscope to deflect the electrons in the oscilloscope by an amount determined by the length or duration of the output pulses from the horizontal sweep generator.

The scan of the oscilloscope 38 is created by modulating the vertical saw-tooth amplitude by a scan angle voltage which varies with the directional position of the corresponding radar antenna beam as determined by a conventional scanning mechanism 65 coupled with the antenna 20. This voltage is applied to a voltage inverter 72 which inverts the input signal and presents the signal to a vertical sweep generator 64. The vertical sweep generator is modulated by the inverted scan angle voltage to produce a sawtooth voltage waveform representative of the direction of the antenna and applies this voltage to the vertical deflection plates of the oscilloscope 38. Interposed in the horizontal sweep and the vertical sweep circuits of the oscilloscope is a centering circuit 68, which may be of any conventional type such as potentiometer means, whereby the signal display of the oscilloscope is properly centered upon the screen.

Upon receipt of an echo at the antenna, the receiver portion of block 61 detects the echo and applies it to the grid of tube 38 via lead 59 to brighten the screen thereof at a point determined by the sweep voltages applied thereto.

The application of the horizontal sweep and the vertical sweep to the oscilloscope as explained above is conventional and will produce a presentation on its screen similar to that of Fig. 3. However, when portions of the input signal to the vertical sweep generator are fed to the horizontal sweep generator by way of lead line 74 connected to the input of the voltage inverter 72, a portion of the input signal which modulates the vertical sweep generator is also fed to the horizontal sweep generator to modulate the horizontal sweep generator. Modulation of the two sweeps at the same instant will produce a display on the screen of the oscilloscope in which the range line will be sloped in one or the other direction depending on whether the modulating voltage applied to the horizontal sweep is applied directly or inversely with relation to the voltage applied to the vertical sweep generator. If the voltage is applied directly to the horizontal sweep generator, the display will slope to the right whereas an inversely applied voltage with respect to the voltage applied to the vertical sweep generator will produce a display slanted to the left. An inverse modulating voltage may be fed to the horizontal sweep generator by taking a portion of the wave from the output rather than the input of the voltage inverter 72.

Similar circuit equipment is provided for the tube 24, as briefly represented by the short connections thereto at the bottom of Fig. 5.

It is seen from the above that an improved ground controlled approach radar indication system has been devised wherein a single display, simulated in three dimensions and easily distinguishable by multiple colors, is presented. It will, of course, be understood that many modifications may be made in the specific apparatus employed to carry out my invention on its broader aspects. For example, the single display may be presented on a single oscilloscope by utilizing electronic switching and time sharing methods of the input signals of the azimuth and elevation displays whereas the colors may be introduced by the same methods employed in color television.

Obviously many other modifications and variations of the present invention are possible in the light of the above teachings. It is therefore to be understood, that within the scope of the appended claims, the invention may be practiced otherwise than specifically described.

What is claimed and desired to be protected by Letters Patent of the United States is:

1. A display arrangement for a radar landing system for aircraft comprising a first and a second oscilloscope indicating means each graphically displaying a respective one of two mutually perpendicular coordinates representing the position of an airplane with respect to a third mutually perpendicular coordinate reference point and positioned normal to each other, a partially reflecting mirror positioned intermediate said oscilloscopes, an optical axis extending through an observing point and through said partially reflecting mirror to the indicating surface of said first oscilloscope indicating means, the second oscilloscope indicating means being positioned normal to the optical axis at a point where the partially reflecting mirror intersects the optical axis, distinguishing means for each of said indicating means, and electronic means connected in the circuit of said second oscilloscope indicating means for slanting its display whereby an observer views from the observing point a single simulated three-dimensional display of the position of the airplane in space relative to said reference point.

2. A single display arrangement for a radar landing system for aircraft comprising a first and a second indicating means each graphically displaying a respective one of two mutually perpendicular coordinates representing, the position of an aircraft relative to a third coordinate mutually perpendicular to said first-mentioned coordinates, an optical system including an optical axis and a partially reflecting mirror, said indicating means being positioned normal to each other with the optical axis passing through the display surface of said first indicating means and through said partially reflecting mirror to an observing position, said mirror being positioned intermediate the indicating means and intersecting said optical axis at a point normal to said second indicating means, distinguishing color means for each of said indicating means, and circuit means connected in the input of said second indicating means for producing a slanted display whereby an observer views from the observing position a single simulated three-dimensional representation of the two displays in multiple colors.

3. In a radar landing system for remotely producing a three-dimensional indication of the position of an aircraft in flight, a first and a second indicating means each displaying the position of the aircraft in one of two mutually perpendicular coordinates with respect to a third coordinate mutually perpendicular to said first-mentioned coordinates, an optical system including an optical axis and a partially reflecting mirror, said mirror being interposed between said indicating means, said optical axis passing through said partially reflecting mirror and through said first indicating means and being normal to said second indicating means, and electronic means for slanting the display of said second indicating means whereby an observer viewing said partially reflecting mirror from a point along said optical axis views a single simulated three-dimensional display of the two individual displays of said indicating means.

References Cited in the file of this patent

UNITED STATES PATENTS

| | | |
|---|---|---|
| 2,479,195 | Alvarez | Aug. 16, 1949 |
| 2,501,748 | Streeter | Mar. 28, 1950 |
| 2,514,828 | Ayres | July 11, 1950 |
| 2,589,216 | Ayres | Mar. 18, 1952 |